United States Patent [19]
Fujishita et al.

[11] Patent Number: 5,388,405
[45] Date of Patent: Feb. 14, 1995

[54] SYSTEM FOR PURIFYING EXHAUST GAS FOR USE IN AN AUTOMOBILE

[75] Inventors: Masakatsu Fujishita, Mito; Takeshi Atago, Katsuta; Akio Honji; Osamu Kuroda, both of Hitachi; Toshio Ogawa, Takahagi; Noriko Watanabe, Mito; Minoru Osuga, Katsuta, all of Japan

[73] Assignee: Hitachi, Ltd., Japan

[21] Appl. No.: 953,218

[22] Filed: Sep. 30, 1992

[30] Foreign Application Priority Data

Sep. 30, 1991 [JP] Japan .................. 3-251233
Oct. 4, 1991 [JP] Japan .................. 3-258178

[51] Int. Cl.⁶ .......................................... F01N 3/20
[52] U.S. Cl. ............................. 60/297; 422/169
[58] Field of Search ............ 60/274, 297; 422/173, 422/174, 175, 169

[56] References Cited

U.S. PATENT DOCUMENTS

| | | | |
|---|---|---|---|
| 5,125,231 | 6/1992 | Patil | 60/274 |
| 5,158,753 | 10/1992 | Take | 60/297 |
| 5,184,462 | 2/1993 | Schatz | 60/297 |

FOREIGN PATENT DOCUMENTS

| | | | |
|---|---|---|---|
| 63-68713 | 3/1988 | Japan . | |
| 253110 | 10/1988 | Japan | 60/297 |
| 257710 | 10/1989 | Japan | 60/297 |
| 3-31510 | 2/1991 | Japan . | |

Primary Examiner—Douglas Hart
Attorney, Agent, or Firm—Evenson, McKeown, Edwards & Lenahan

[57] ABSTRACT

A system for purifying an exhaust gas for use in an automobile is disclosed which does not externally discharge unburnt hydrocarbons until a catalyst becomes active. An adsorbent is provided upstream of the catalyst. A heat exchanger is disposed between an upstream portion of the adsorbent and a portion between the adsorbent and the catalyst for controlling the elevation of the temperature of the adsorbent and for promoting the elevation of the temperature of the catalyst. The unburnt hydrocarbons are absorbed by the adsorbent in the initial period of time from starting of an engine until the catalyst becomes active. Temperature control is made in such a manner that the unburnt hydrocarbons which are adsorbed by the adsorbent begins to be desorbed therefrom substantially simultaneously with the time when the catalyst begins to function. A large quantity of unburnt hydrocarbons which are emitted from an engine immediately after the starting of the engine are prevented from being externally discharged without being treated.

2 Claims, 6 Drawing Sheets

NORMALITY DETERMINATION CONDITION (1) $No.5 - \alpha_2 \leq No.3 \leq No.2 + \alpha_1$ (2) $No.2 - \alpha_2 \leq No.3 \leq No.5 + \alpha_1$

SYSTEM FOR PURIFYING EXHAUST GAS FOR USE IN AN AUTOMOBILE

BACKGROUND OF THE INVENTION

1. Field of the Invention

The present invention relates to an exhaust gas purifying system for use in an automobile and in particular to an exhaust gas purifying system for temporarily adsorbing an automobile exhaust gas by an adsorbent until an exhaust gas treating catalyst becomes active.

2 Prior Art

The exhaust gas emitted from automobiles are one of the main causes of air pollution and therefore are regulated by a number of regulations on exhaust gas emissions.

The current exhaust gas emission level regulations are complied with by the treatment of the exhaust gas with a ternary catalyst including platinum, rhodium, etc. The unburnt hydrocarbons and nitrogen oxides and the like in the exhaust gas emitted from an automobile have been considerably decreased compared to emissions prior to these regulations.

However, in the prior art, the exhaust gas can not be treated with the ternary catalyst until the temperature of the ternary catalyst is elevated to a temperature at which it becomes active (the light off temperature, about 350° C.). The unburnt hydrocarbons are discharged without being treated particularly immediately after starting of the engine, although the concentration of the unburnt hydrocarbons is very high. If the starting temperature is, for example, 20° C., about 100 seconds are taken for the catalyst to reach the light off temperature (about 350° C.). In this period of time, unburnt hydrocarbons having a very high concentration which can be as high as 7000 to 8000 ppm are discharged.

It has been proposed as a countermeasure to this problem to preliminarily heat a catalyst with an electric heater as is known by SAE paper 900503 and Japanese Unexamined Patent Publication No. Tokkai-Hei 3-31510. These proposals have a practical difficulty since it requires such a large amount of electric power.

It has been known that unburnt hydrocarbons are adsorbed by an adsorbent upstream of a catalyst until the catalyst is activated (Japanese Unexamined Patent Publication No. Tokkai-Sho 63-68713).

Recently, air pollution has become a more serious concern again, since the absolute amount of the emitted exhaust gas has increased due to the increase in the number and the size of automobiles. It has been decided that stricter exhaust gas regulations will be enforced as a solution for this air pollution problem. For example, it has been decided that LEV (Low Emission Vehicle) regulation will be enforced in Calif., U.S.A from 1997. This regulation will be enforced in all States in the U.S.A.

SUMMARY OF THE INVENTION

It is therefore an object of the present invention to provide an exhaust gas purifying system for use in an automobile which is capable of treating an emitted exhaust gas immediately after starting of an engine until a catalyst is heated up to a temperature at which the catalyst becomes active.

In an aspect of the present invention, there is provided a process for purifying an exhaust gas for use in an automobile in which an exhaust gas treating catalyst and an adsorbent having a temperature range at which the adsorbent adsorbs unburnt hydrocarbons (hereinafter referred to as "adsorption zone") and a temperature range at which the adsorbent desorbs the adsorbed unburnt hydrocarbons (hereinafter referred to as "desorption zone") are disposed in an exhaust gas passage from an engine and the unburnt hydrocarbons in the exhaust gas are temporarily adsorbed by the adsorbent when the catalyst does not function, wherein the temperature control of at least one of the adsorbent and catalyst is carried out in such a manner that the time when the temperature of the adsorbent reaches the desorption zone coincides with the time when the temperature of the catalyst reaches a temperature at which the catalyst becomes active.

In another aspect of the present invention, there is provided a system for purifying an exhaust gas for use in an automobile which comprises an exhaust gas treating catalyst disposed in an exhaust gas passage from an engine, an adsorbent having a temperature range at which the adsorbent adsorbs unburnt hydrocarbons and a temperature range at which the adsorbent desorbs the adsorbed unburnt hydrocarbons, which is disposed in the exhaust gas passage upstream of the catalyst and temperature control means for maintaining the temperature of the adsorbent so that unburnt hydrocarbons contained in the exhaust gas are temporarily adsorbed by the adsorbent when the catalyst does not function and for bringing the temperature of the adsorbent into the desorption zone to desorb the adsorbed unburnt hydrocarbons when the catalyst begins to function.

The temperature control means comprises a heat exchanger which is disposed between a portion of the exhaust gas passage upstream of the adsorbent and a portion of the exhaust gas passage between the adsorbent and the catalyst.

Air supplying means for supplying air to the exhaust gas passage is provided in the exhaust gas passage upstream of the catalyst.

The system for purifying an exhaust gas for use in an automobile may further include means for detecting the amount of air which is supplied to the engine, means for adjusting the pressure in the adsorbent in the exhaust gas passage and means for controlling the pressure controlling means based upon the detection result of the air amount detecting means.

The system for purifying an exhaust gas for use in an automobile may further include means for detecting the pressure of the exhaust gas in the adsorbent, means for adjusting the pressure in the adsorbent disposed in the exhaust gas passage and means for controlling the pressure controlling means based upon the detection result of the air amount detecting means.

In a further aspect of the present invention,, there is provided a system for purifying an exhaust gas for use in an automobile which comprises an exhaust gas main passage for discharging the exhaust gas from an engine, a bypass passage for connecting an upstream portion of the exhaust gas main passage with a downstream portion of the exhaust gas main passage, adsorbent disposed in the bypass passage having a temperature range at which the adsorbent adsorbs unburnt hydrocarbons, a temperature range above the adsorption zone, at which the adsorbent desorbs the adsorbed unburnt hydrocarbons therefrom and a further higher temperature range at which the adsorbed material which can not be completely desorbed in the desorption zone can be eliminated from the adsorbent (hereinafter referred to as regeneration zone), exhaust gas treating catalyst provided in the exhaust gas passage in parallel with the bypass passage, means for detecting the temperature of the adsorbing means and/or the catalyst, air supplying means disposed in the bypass passage downstream of the adsorbent, passage changing means provided at the exit of the bypass passage for adjusting the ratio of the flow rate of the exhaust gas through the exhaust gas main passage to that through the bypass passage, and means for controlling the passage changing means in such a manner that the exhaust gas is caused to flow through the bypass passage when the temperature of the adsorbent falls in the adsorption zone and the bypass passage is closed to cause the exhaust gas to flow through the main passage and air is supplied to the bypass passage by the air supply means when the temperature of the adsorbent falls in the desorption zone.

The system for purifying an exhaust gas for use in an automobile may further include subsidiary bypass means for introducing the exhaust gas into the bypass passage in the downstream side of the adsorbent from the exhaust gas main passage and the control means being capable of elevating the temperature of the adsorbent up to the regeneration zone by causing the exhaust gas to flow into the bypass passage via the subsidiary bypass passage.

In a further aspect of the present invention, there is provided a system for purifying an exhaust gas for use in an automobile which comprises an exhaust gas main passage for discharging the exhaust gas from an engine, a bypass passage for connecting an upstream portion of the exhaust gas main passage with a downstream portion of the exhaust gas main passage, adsorbent disposed in the bypass passage having a temperature range at which the adsorbent adsorbs unburnt hydrocarbons, a temperature range above the adsorption zone, at which the adsorbent desorbs the adsorbed unburnt hydrocarbons therefrom and a further higher temperature range at which the adsorbed materials which can not be completely desorbed in the desorption zone can be eliminated therefrom, exhaust gas treating catalyst provided in the exhaust gas passage in parallel with the bypass passage, means for detecting the temperature of the adsorbing means and/or the catalyst, air supplying means disposed in the bypass passage upstream of the adsorbent, passage changing means provided at the exit of the bypass passage for adjusting the ratio of the flow rate of the exhaust gas through the exhaust gas main passage to that through the bypass passage, exhaust gas recirculating means which connects the bypass passage downstream of the adsorbent with an air intake system of the engine for returning a desired amount of the exhaust gas to the air intake system, means for controlling the passage changing means in such a manner that the exhaust gas is caused to flow through the bypass passage when the temperature of the adsorbent falls in the adsorption zone and the bypass passage is closed to cause the exhaust gas to flow through the main passage and air is supplied to the bypass passage by the air supply means when the temperature of the adsorbent falls in the desorption zone.

The system for purifying an exhaust gas for use in an automobile may further include subsidiary bypass means for introducing the exhaust gas into the bypass passage in the upstream side of the adsorbent from the exhaust gas main passage. The control means is preferably capable of elevating the temperature of the adsorbent up to the regeneration zone by causing the exhaust gas to flow into the bypass passage via the subsidiary bypass passage.

The system may further include means for detecting the amount of air supplied to the engine and the control means is preferably capable of controlling the amount of the exhaust gas which is recirculated by the exhaust gas recirculating means based upon the detection result of the air amount detecting means.

In a further aspect of the present invention, there is provided a system for purifying an exhaust gas for use in an automobile which comprises an exhaust gas main passage for discharging the exhaust gas from an engine, a bypass passage for connecting an upstream portion of the exhaust gas main passage with a downstream portion of the exhaust gas main passage, adsorbent disposed in the bypass passage having a temperature range at which the adsorbent adsorbs unburnt hydrocarbons, a temperature range above the adsorption zone, at which the adsorbent desorbs the adsorbed unburnt hydrocarbons therefrom and a further higher temperature range at which the adsorbed material which can not be completely desorbed in the desorption zone can be eliminated therefrom, exhaust gas treating catalyst provided in the exhaust gas passage downstream of the bypass passage, means for detecting the temperature of the adsorbing means and/or the catalyst, air supplying means disposed in the exhaust passage upstream of the bypass passage, passage changing means provided at the entrance of the bypass passage for adjusting the ratio of the flow rate of the exhaust gas through the exhaust gas main passage to that through the bypass passage, and means for controlling the passage changing means in such a manner that the exhaust gas is caused to flow through the bypass passage when the temperature of the adsorbent falls in the adsorption zone and the bypass passage is closed to cause the exhaust gas to flow through the main passage and air is supplied to the bypass passage by the air supply means when the temperature of the adsorbent falls in the desorption zone and the catalyst does not function and the exhaust gas is caused to flow to the bypass passage when the catalyst functions.

A second catalyst having an activation temperature lower than that of the catalyst is preferably provided in the bypass passage.

The temperature of the adsorbent is maintained in the adsorption zone so that the unburnt hydrocarbons are temporarily adsorbed by the adsorbent until the temperature of the catalyst is elevated so that the catalyst becomes active. Temperature control is conducted in such a manner that the adsorbent reaches the desorption temperature simultaneously with the time when the catalyst reaches the light off temperature. This will cause the unburnt hydrocarbons which were temporarily adsorbed by the adsorbent to be treated with the catalyst.

This temperature control is automatically achieved if the light off temperature of the catalyst matches with the desorption zone of the adsorbent. If they do not match with each other, the temperature control is enabled by eliminating heat from the exhaust gas in a position upstream of the adsorbent by means of, for example, a heat exchanger so that the heat is used for heating the catalyst.

In the above mentioned operation, the adsorption efficiency can be enhanced by controlling the pressure in the adsorber depending upon the amount of air supplied to the engine which is detected by the air amount detecting means and the pressure in the adsorber which is detected by the pressure detecting means.

Deviation of the air/fuel ratio of the exhaust gas from the stoichiometric air/fuel ratio due to the presence of the desorbed unburnt hydrocarbons is prevented by supplying air upstream of the catalyst from the air supplying means.

Initially, the exhaust gas is caused to flow through the bypass passage by the passage changing means so that the unburnt hydrocarbons are adsorbed. When the temperature of the adsorbent reaches the desorption zone, the exhaust gas is caused to flow through the main passage by means of the passage changing means. On the other hand, air is supplied to the bypass passage by means of the air supplying means so that the desorbed unburnt hydrocarbons flows through the bypass passage in a reverse direction and is returned to the main passage or returned to the air intake system of the engine by means of the exhaust gas recirculating means. In this case, the amount of air supplied by the air supplying means is determined based upon the detection result of the air amount detecting means.

In the case where the catalyst is disposed in parallel with the bypass passage, the catalyst is heated on adsorption by causing the exhaust gas to flow through the subsidiary bypass passage. On the other hand, the adsorbent is heated on desorption and regeneration of the adsorbent.

An arrangement in which the catalyst is disposed downstream of the bypass passage will be described.

When the temperature of the adsorbent is in the desorption zone and the temperature of the catalyst does not reach the light off temperature, the exhaust gas is caused to flow to the main passage while air is supplied to the exhaust gas main passage by the air supplying means which is provided upstream of the catalyst. This enables the unburnt hydrocarbons to be burnt in the main passage.

In accordance with the present invention, the unburnt hydrocarbons can be adsorbed even if the catalyst has not been sufficiently warmed up immediately after the starting of the engine.

Other objects, advantages and novel features of the present invention will become apparent from the following detailed description of the invention when considered in conjunction with the accompanying drawings.

DESCRIPTION OF THE PREFERRED EMBODIMENTS

Various embodiments of the present invention will be described with reference to the Figures.

A basic concept of the present invention resides in that unburnt hydrocarbons are temporarily adsorbed by an adsorbent and are not discharged until a catalyst reaches an activity exhibiting temperature, in other words, when treatment of an exhaust gas with the catalyst becomes possible the adsorbed unburnt hydrocarbons are desorbed and released for the final treatment with the catalyst when the catalyst becomes active.

An adsorbent which is essential in the present invention will firstly be described.

An adsorbent having a property to adsorb an desired material, unburnt hydrocarbons in the present embodiment, should of course be used. Its property depends upon the temperature.

Figure 1:
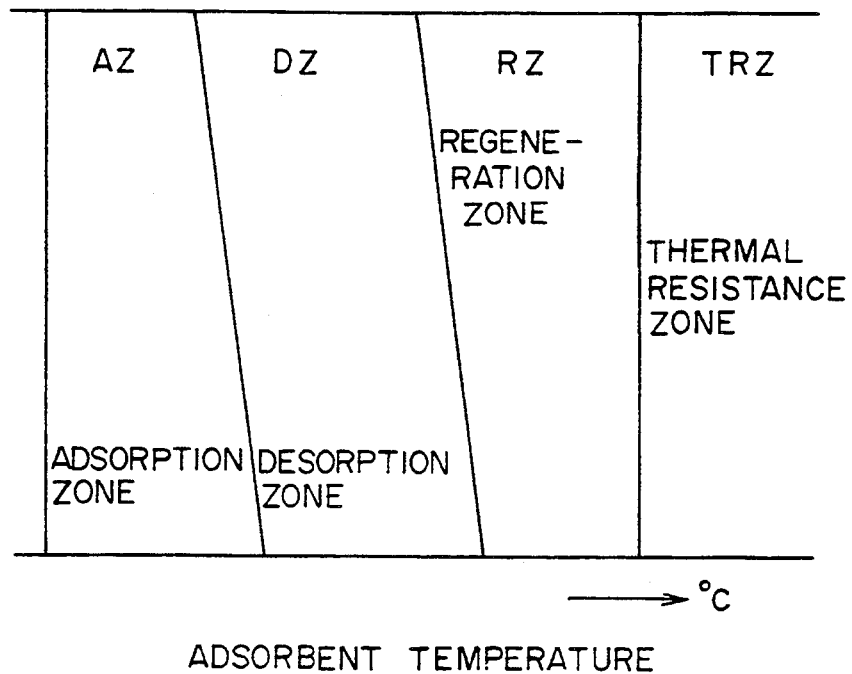
FIG. 1 is an explanatory view showing the characteristics of an adsorbent.

The adsorbent adsorbs unburnt hydrocarbons at low temperature as shown in FIG. 1. This temperature zone is represented as an adsorption zone AZ in the drawing. The adsorbed unburnt hydrocarbons are desorbed at higher temperatures. This temperature zone is represented as a desorption zone DZ. The adsorbed unburnt hydrocarbons are not completely desorbed when the temperature reaches the desorption temperature. Some of the adsorbed unburnt hydrocarbons remain adsorbed. In order to remove such unburned hydrocarbons, they are burnt, by elevating the temperature of the adsorbent even further. This zone is represented as a regeneration zone RZ.

It is necessary that a temperature limit (represented as thermal resistance zone TRZ) at which the catalyst, etc. are broken be at an even higher temperature range.

The present invention utilizes the temperature characteristic of such an adsorbent. In other words, the temperature of the adsorbent is maintained in the, adsorbing zone so that the adsorbent adsorbs unburnt hydrocarbons until the catalyst is activated. After the activation of the catalyst, the temperature of the adsorbent is elevated to the desorbing zone for desorbing and releasing the adsorbed unburnt hydrocarbons. If much undesorbed unburnt hydrocarbons remains so that the adsorbing capacity of adsorbent is lowered, the adsorbent is regenerated by elevating the temperature to the regeneration zone to increase the adsorbing capacity again.

Such an adsorbing system per se is completely independent of the exhaust gas treatment with a catalyst. It is thus necessary to independently perform the temperature control of the adsorbing system. The temperatures of the adsorbing zone, etc. depend upon the kind of catalyst.

Accordingly, it is not necessary to independently perform the temperature control of the adsorbing system if the characteristics of the adsorbent match with those of the catalyst. It suffices to perform a consolidated temperature control for both the adsorbent and the catalyst. If they do not properly match with each other, it is necessary to perform the temperature control of the adsorbing system independently of that of the catalyst. In other words, it is necessary to correspondingly perform the temperature control of the adsorbing system and the catalyst system by changing, for example, the structure of pipings, etc. depending upon the temperature characteristics of the adsorbent and the catalyst. This temperature control will be described hereafter in the following description of the embodiments.

The characteristics of the adsorption have been described with reference to only the influence by temperature. They may however, be influenced by pressure, space velocity, etc. as well as temperature. The adsorption rate becomes higher as the pressure becomes higher while conversely the desorption rate becomes faster as the pressure becomes lower. As the space velocity becomes lower, the adsorption rate becomes higher.

Various embodiments of an exhaust gas purifying system for use in an automobile will be described hereafter.

Figure 2:
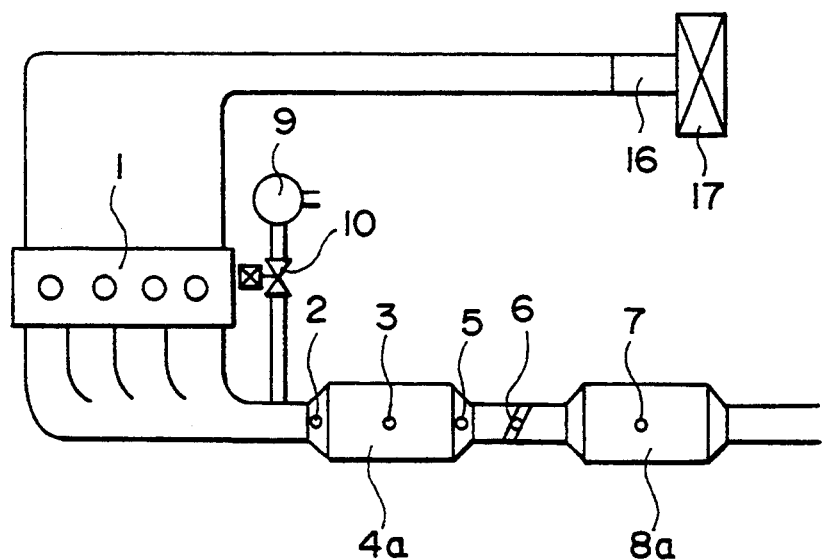
FIG. 2 is a schematic diagram showing a first embodiment of an exhaust gas purifying system of the present invention for use in an automobile.

A first embodiment in which an adsorbent is disposed upstream of a catalyst in an exhaust gas passage is shown in FIG. 2.

In the present embodiment, an adsorber 4a which contains an adsorbent 4 therein is provided in an exhaust gas passage which is connected with an engine 1. A main catalytic converter 8a containing a main catalyst 8 is disposed in the passage downstream of the adsorber 4a.

A secondary air pump 9 and a secondary air amount control valve 10 are provided in the passage upstream of the adsorber 4a. A pressure control valve 6 is provided between the adsorber 4a and the main catalytic converter 8a.

The adsorbent having the above mentioned desorption zone in a temperature range which is not lower than the light off temperature of the main catalyst 8 is most preferable in the present embodiment. In other words, if the temperature characteristics of the adsorbent 4 match those of the main catalyst 8 so that it is not necessary to independently control only the temperature of the adsorbent 4, the present invention may take a structure like the present embodiment. Specifically, it is preferable that the temperature ranges of the desorption and regeneration zones fall into a temperature range attained by the exhaust gas after an automobile having the engine 1 has been running for a while. In this case, desorption and regeneration of the adsorbent will be conducted by the usual running of the automobile. If the desorption characteristics are excellent, no regeneration zone need exist. Since the exhaust gas passes through the adsorber 4a without being adsorbed in the usual running, the adsorbent 4 should have enough heat resistance which is equal to or higher than that of the main catalyst. (The adsorbent 4 may be heated to a temperature which is higher than the temperature of the main catalyst 8 since the adsorbent 4 is provided upstream of the main catalyst 8.)

It is of course necessary to adsorb the unburnt hydrocarbons in the temperature range on starting of the engine.

The adsorber 4a is provided with an exhaust gas temperature sensor 2, an adsorbent temperature sensor 3 and an exhaust gas temperature sensor 5 for accurately measuring the temperature. The method of measuring the temperature by these sensors will be described hereafter with reference to the other structures.

The main catalyst 8 is made of a ternary catalyst. The main catalytic converter 8a is provided with a catalyst temperature sensor 7 for measuring the temperature of the main catalyst 8. The temperature which is measured by the catalyst temperature sensor 7 is used for controlling various valves. The method of controlling the valves is not described herein in detail.

The secondary air pump 9 and the secondary air amount control valve 10 are provided to maintain the concentration of oxygen of the exhaust gas flowing into the main catalyst 8 at a value suitable for treatment. Even if the air/fuel mixture supplied to the engine 1 has the stoichiometric air/fuel ratio, due to the presence of the unburnt hydrocarbons desorbed from the adsorbent 4, the concentration of the oxygen of the exhaust gas reaching the main catalyst 8 may be low. In this occasion, there is a shortage of oxygen for treatment of all the unburnt hydrocarbons.

The pressure control valve 6 is provided for adjusting the space velocity, i.e. the flow rate of the exhaust gas. This decreases the space velocity of the exhaust gas into a range in which the conditions of the temperature, etc. allow the adsorpability of the adsorbent for the unburnt hydrocarbons to be enhanced. Data on the amount of the exhaust gas is necessary to control the pressure control valve 6. The amount of air which is taken in through an air cleaner 17 is measured by an air flow rate detector 16 for calculating the amount of the exhaust gas based upon the measured amount of the intake air. In this embodiment, the amount of the intake air approximates to the amount of the exhaust gas. Although not described in detail, the amount of the intake air which is measured by the air amount detector 16 is not only used for controlling the pressure control valve 6, but is also used for controlling the various valves in the alternative embodiments which will be described hereafter.

Adjusting the space velocity of the exhaust gas will adjust the pressure of the exhaust gas in the adsorber 4a. In this case, the temperature of the exhaust gas may change. However, this change in temperature is negligibly small. The exhaust gas purifying system for use in an automobile is therefore capable of controlling the space velocity of the exhaust gas substantially independently of the temperature.

The operation in the first embodiment will now be described.

The main catalyst 8 does not function when the engine 1 is started since the temperature of the catalyst 8 is low. The unburnt hydrocarbons are not discharged since the adsorbent 4 adsorbs the unburnt hydrocarbons in the exhaust gas even at the low temperatures.

When the temperature of the main catalyst 8 is elevated to the light off temperature, the main catalyst 8 will begin to treat the unburnt hydrocarbons, etc. Substantially simultaneously with this, the temperature of the adsorbent 4 rises into the desorption zone and desorbs the adsorbed unburnt hydrocarbons. Under this condition, the exhaust gas emitted from the engine 1 and the unburnt hydrocarbons desorbed from the adsorbent 4 are treated with the main catalyst 8. In this case, at the catalytic converter 8a it is possible to run short of oxygen. This phenomenon can be adjusted by supplying additional air to the catalytic converter 8a from the secondary air pump 9.

An oxygen detecting means may be provided immediately upstream of the catalytic converter 8a for controlling the secondary air pump 9, etc. based upon the result of detection. This enables accurate control of the concentration of the oxygen in the exhaust gas.

Regeneration of the adsorbent 4 will be automatically achieved if the temperature of the adsorbent 4 is elevated by the hot exhaust gas after running of the vehicle for a while.

Figure 12:
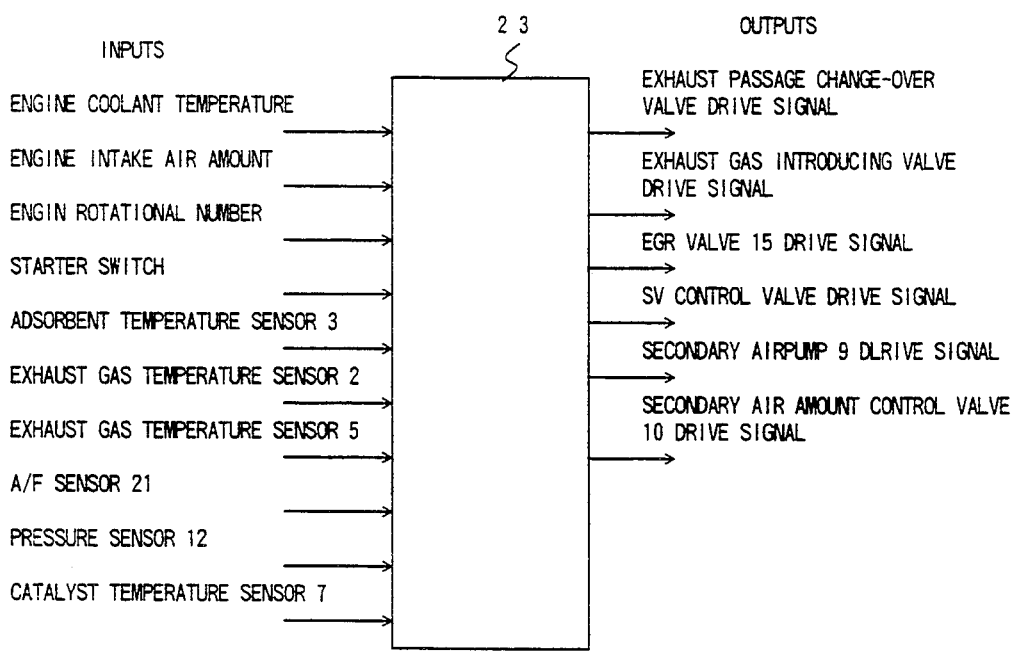
FIG. 12 is an explanatory view showing the inputs and outputs to and from a control unit in an embodiment of the present invention.

The above mentioned operation is performed in accordance with instructions from a control unit 23 shown in FIG. 12. The control unit 23 will be described later.

Figure 3:
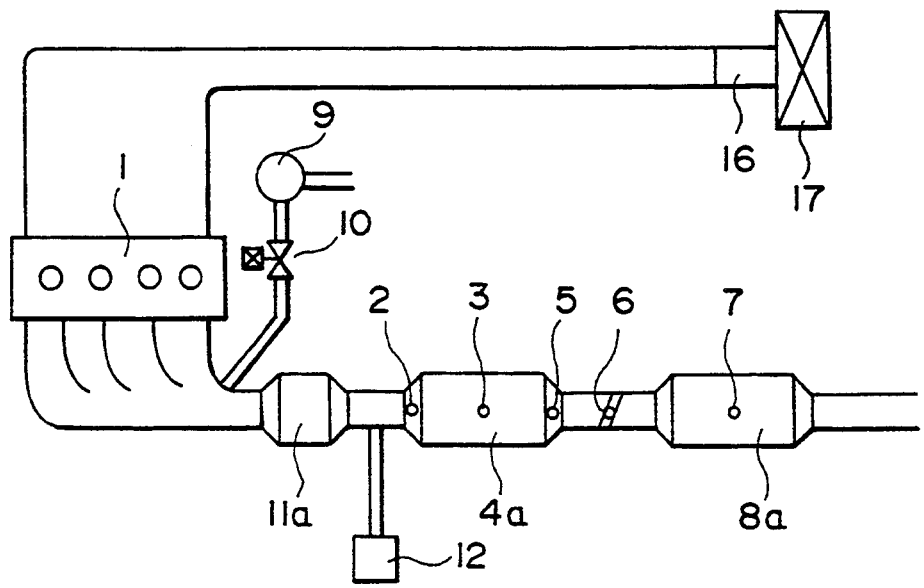
FIG. 3 is a schematic diagram showing a second embodiment of an exhaust gas purifying system of the present invention for use in an automobile.

A second embodiment in which the system of the first embodiment is provided with a preliminary catalytic converter 11a containing a preliminary catalyst 11 and a pressure detector 12 is shown in FIG. 3.

In this embodiment, providing of the pressure detector 12 enables a pressure control valve 6 to be accurately controlled so that the capacity of the adsorbent can be utilized at its maximum.

The preliminary catalytic converter 11 a which is provided upstream of an adsorber 4a, i.e. in a position close to the exhaust slot of an engine 1, for example, is directly mounted on an exhaust manifold to enable shortening of the period of time which is taken to obtain the activity of the catalyst since the elevation in the temperature of the preliminary catalyst 11 is fast. Although the preliminary catalyst 11 may be identical with the main catalyst 8, it is necessary to use a catalyst having a high thermal resistance since it is disposed in a position close to the engine 1.

A third embodiment will be described with reference to FIG. 4.

In this embodiment, a bypass exhaust pipe 13 is provided in the exhaust gas passage and the adsorber 4a containing the adsorbent 4 is disposed in the bypass exhaust pipe 13. A secondary air pump 9 and a secondary air amount control valve 10 for adjusting the air/fuel ratio (oxygen concentration) of the exhaust gas are connected to the bypass exhaust pipe 13 downstream of the adsorber 4a containing the adsorbent 4. An gas passage change-over valve 18 for controlling the admission of the exhaust gas into the bypass exhaust pipe 13 is provided at the exit of the bypass exhaust pipe 13. Switching between the main passage, provided with the main catalytic converter 8a and the bypass exhaust pipe 13 through which the exhaust gas emitted from the engine 1 flows through can be made by actuating the change-over valve 18. The opening of the exhaust passage change-over valve 18 is adjustable so that some of the exhaust gas can flow through the bypass exhaust pipe 13.

The reason why the secondary air pump 9 and the secondary air amount control valve 10 are disposed downstream of the adsorber 4a and the exhaust passage change-over valve 18 is disposed at the exit of the bypass exhaust pipe 13 is that a backflow of the exhaust gas through the bypass exhaust pipe 13 may otherwise occur when the unburnt hydrocarbons are desorbed from the adsorbent 4.

The main catalytic converter 8a is disposed in the main passage of the exhaust gas passage in parallel with the adsorber 4a. Since the exhaust gas does not flow through the main catalytic converter 8a while the exhaust gas flows through the bypass exhaust pipe 13, the elevation in temperature of the main catalyst 8 is slow. The slowness of the elevation in temperature of the main catalyst 8 can be sufficiently compensated for by modifying the geometrical configuration of piping. This may be achieved, for example, by shortening the distance between the main catalytic converter 8a and a branch between the bypass exhaust pipe 13 and the main passage or by arranging the bypass exhaust pipe 13 around the main catalytic converter 8a in a spiral manner. The reason why the exhaust passage change-over valve 18 is disposed downstream of the bypass exhaust pipe 13 is that even when the exhaust gas is caused to flow through the bypass exhaust pipe 13, the passage per se is not interrupted at the entrance of the bypass exhaust pipe 13 so that the heat in the exhaust gas is ready to conduct to the main catalyst 8 in the converter 8a.

An A/F (air/fuel ratio) sensor 21 is provided between a main catalytic converter 8a and the branch between the main flow line and the bypass exhaust pipe 13 for monitoring the change in the concentration of the oxygen of the exhaust gas flowing into the main catalytic converter 8a which is caused by the unburnt hydrocarbons desorbed from the adsorbent 4. The detection result from the A/F sensor 21 is used to control the above mentioned secondary air pump 9 and the secondary air amount control valve 10 so that a suitable concentration of oxygen for the treatment by the main catalyst 8 is maintained.

Since the arrangement of the adsorbent 4 in the bypass exhaust pipe 13 enables the control of the adsorbent temperature to be performed independently of that of the catalyst in the present embodiment, whether or not the desorption zone matches with the characteristics of the main catalyst 8 will not matter. This similarly applies to the regeneration zone and the heat resistance zone. However, it is necessary to perform the control of the adsorbent temperature to provide such an adsorption zone that the unburnt hydrocarbons are adsorbed also in the temperature range on starting of the engine 1, similarly to the foregoing embodiments.

An exhaust gas temperature sensor 2, adsorbent temperature sensor 3, exhaust gas temperature sensor 5 and catalyst temperature sensor 7 are identical with corresponding sensors in the foregoing embodiments. Detection of the temperature will be described in detail hereafter. The temperature control means comprises the bypass exhaust pipe 13, the exhaust passage change-over valve 18, the temperature sensors 2, 3, 5, 7 and a control unit 23 (shown in FIG. 12) for controlling the exhaust passage change-over valve 18 in response to the output from each of the temperature sensors.

When the engine 1 is started, the exhaust passage change-over valve 18 is in such a position a, as represented by a dotted line, that the unburnt hydrocarbons in the exhaust gas are adsorbed by the adsorbent 4 and are not externally discharged.

The temperatures of the adsorbent 4 and the main catalyst are monitored based upon the outputs from the exhaust gas temperature sensor 2, the adsorbent temperature sensor 3, the exhaust gas temperature sensor 5 and the catalyst temperature sensor 7. When the temperature of the adsorbent 4 comes close to the desorption zone, the exhaust passage change-over valve 18 is gradually opened so that a part of the exhaust gas passes through the main catalytic converter 8a. The main catalyst 8 in the converter has already been warmed to some extent and the temperature of the exhaust gas per se is higher than that immediately after the-starting of the engine. Accordingly, the main catalyst 8 quickly reaches the light off temperature.

When it is confirmed by the catalyst temperature sensor 7 that the temperature of the main catalyst 8 has been sufficiently elevated, the exhaust passage change-over valve 18 is brought into a position b so that all the exhaust gas passes through the main catalytic converter 8a. Thereafter, the exhaust gas newly emitted from the engine 1 will thus be directly treated with the main catalyst 8.

When the exhaust passage change-over valve 18 is brought into the position b, the temperature of the adsorbent 4 is in the desorption zone.

Accordingly, by operating the secondary air pump 9 and the secondary air amount control valve 10 in the position b of the valve 19 the unburnt hydrocarbons which are desorbed from the adsorbent 4 are caused to flow through the bypass exhaust pipe 13 in a reverse direction and then to pass through the main catalytic converter 8a so that they are treated with the main catalyst 8.

At this time, the concentration of the oxygen of the exhaust gas is monitored by the A/F sensor 21 and the amount of air fed to the bypass exhaust pipe 13 is adjusted by the secondary air pump 9 and the secondary air amount control valve 10 in order not to be short of oxygen in the exhaust gas passed through the main catalytic converter 8a, due to the introduction of the desorbed unburnt hydrocarbons.

Elevation in temperature of the adsorbent 4 which is required for the regeneration thereof can be sufficiently obtained from the heat conducted from the exhaust gas passing through the main catalytic converter 8a if the layout and the geometrical configuration of the bypass exhaust pipe 13 is modified as is similar to the heating of the main catalyst 8 as mentioned above.

When the exhaust gas is caused to flow through the bypass exhaust pipe 13 in a reverse direction, unburnt hydrocarbons are externally discharged without being treated until the main catalyst 8 reaches the light off temperature. This is not a serious problem since a certain period of time has lapsed from the starting of the engine and the level of unburnt hydrocarbons in the exhaust gas is less than that immediately after the engine is started and this period of time is short. Accordingly, the desorption temperature of the adsorbent 4 necessarily need not be equal to the light off temperature of the main catalyst 8. This problem can be easily solved if the temperature of the adsorbent 4 is controlled by separate means for introducing air into the bypass exhaust pipe 13 in a position upstream of the adsorbent 4 so that the temperature of the adsorbent 4 does not reach the desorption zone until the main catalyst 8 reaches the light off temperature.

The above mentioned operation is all performed in accordance with instructions from the control unit 23 shown in FIG. 12. The control unit 23 will be described in the last part of the specification.

A fourth embodiment will be described with reference to FIG. 5.

Figure 4:
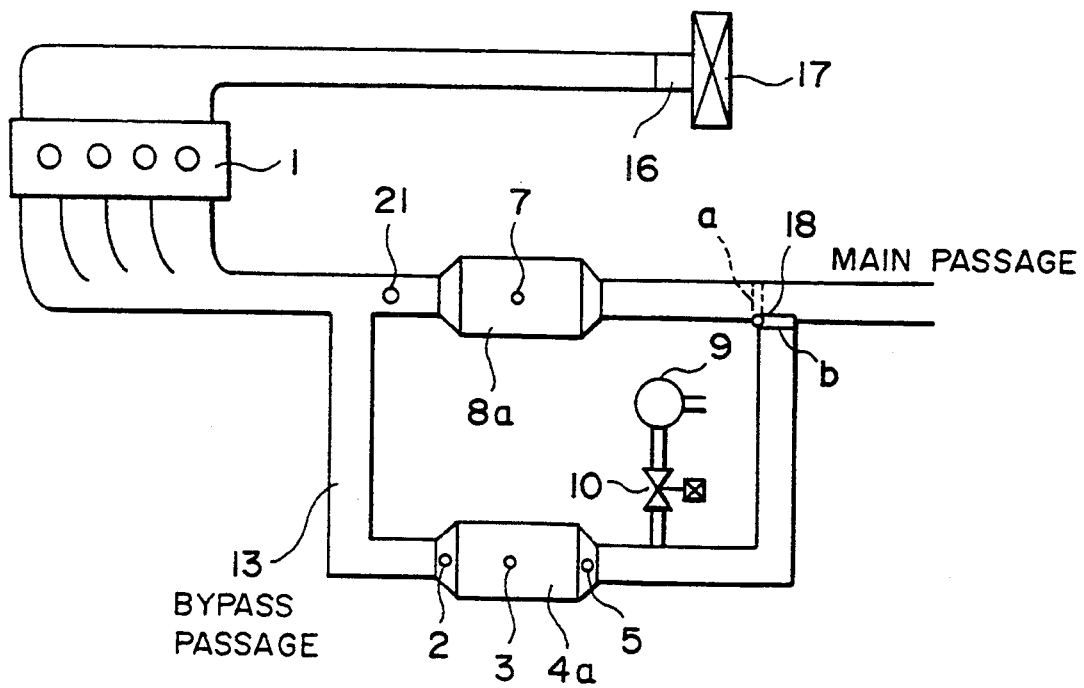
FIG. 4 is a schematic diagram showing a third embodiment of an exhaust gas purifying system of the present invention for use in an automobile.

The present embodiment is substantially identical with the third embodiment shown in FIG. 4 except that the desorbed unburnt hydrocarbons do not flow back through the bypass exhaust pipe 13 for passing through the main catalytic converter 8a, but are returned to an intake system of the engine 1 through an EGR (Exhaust Gas Recirculation) valve 15 which is provided downstream of the adsorber 4a of the bypass exhaust pipe 13. The secondary air pump 9 and the secondary air amount control valve 10 are disposed upstream of the adsorber 4a.

The operation in the present embodiment is substantially identical with that in the foregoing embodiments. The EGR valve 15 is controlled so that it is opened when the adsorbed unburnt hydrocarbons are desorbed, i.e. when the exhaust passage change-over valve 18 is in the position b. This control is made depending upon the intake air amount which is measured by the air amount detector 16.

A heat source which is necessary for the regeneration of the adsorber can be provided by modifying the layout of the exhaust flow line. Alternatively, the adsorbent 4 may be heated by the introduction of the exhaust gas into the bypass exhaust pipe 13 by more or less opening the exhaust passage change-over valve 18 or the EGR valve 15.

In this embodiment, the exhaust gas does not flow through the bypass exhaust pipe 13 in a reverse direction so that smooth control can be made.

Figure 6:
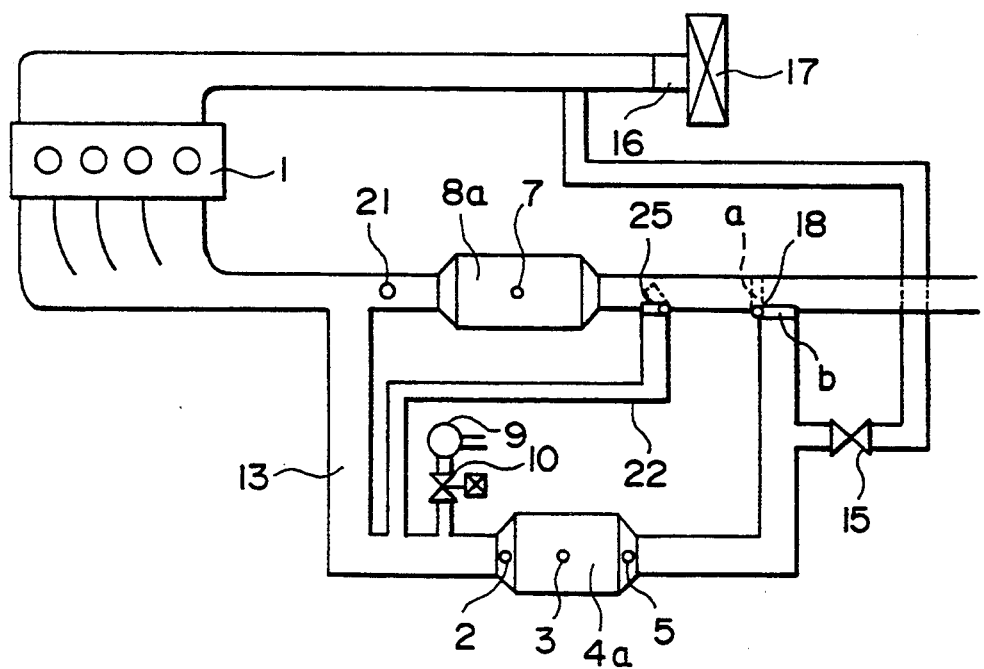
FIG. 6 is a schematic diagram showing a fifth embodiment of an exhaust gas purifying system of the present invention for use in an automobile.

A fifth embodiment will be described with reference to FIG. 6.

Figure 5:
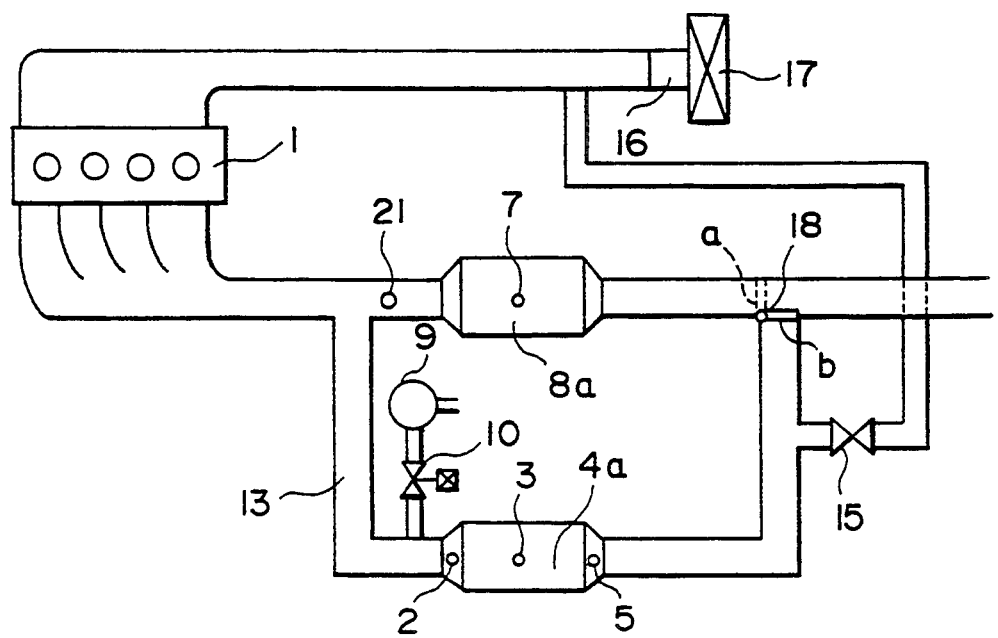
FIG. 5 is a schematic diagram showing a fourth embodiment of an exhaust gas purifying system of the present invention for use in an automobile.

The present embodiment is substantially identical with the embodiment of FIG. 5 except that the exhaust gas is introduced to the bypass exhaust pipe 13 from the main passage of the exhaust gas passage as a heat source for heating the adsorbent 4 to the regeneration zone for more smoothly conducting the regeneration of the adsorbent 4.

In this embodiment, an exhaust gas introducing valve 25 is provided downstream of the catalytic converter 8a in the main exhaust gas passage which is parallel with the bypass exhaust pipe 13. A subsidiary bypass exhaust pipe 22 is provided for introducing the exhaust gas flowing via the exhaust gas introducing valve 25 into the bypass exhaust pipe 13 upstream of the adsorber 4a.

The opening of the exhaust gas introducing valve 25 is adjusted based on the results detected by the exhaust gas temperature sensor 2, the exhaust gas temperature sensor 5, and the catalyst temperature sensor 7.

The operation of the present embodiment will be described.

The operation of the present embodiment is substantially identical with that of the embodiment of FIG. 5.

When the unburnt hydrocarbons are adsorbed in the adsorbent 4 immediately after the start of the engine 1, the exhaust gas passage change-over valve 18 is brought into a position a so that exhaust gas passes through the bypass exhaust pipe 13. The exhaust gas is caused to flow through the main catalytic converter 8a to some extent by slightly opening the exhaust gas introducing valve 25 in this position a of the valve 18. This causes the temperature of the main catalyst 8 to be quickly elevated.

Regeneration of the adsorbent 4 is conducted during the usual running of the vehicle, i.e. while the temperature of the main catalyst 8 has been sufficiently elevated and the treatment of the exhaust gas is performed with the main catalyst 8.

On regeneration of the adsorbent, the exhaust gas introducing valve 25 is slightly opened to cause a part of the hot exhaust gas which has passed through the main catalyst 8 to flow to the upstream side of the adsorber 4a. This enables the adsorbent 4 to be heated to a sufficiently high temperature. At this time, the opening of the exhaust gas introducing valve 25 is adjusted based upon the temperatures which are measured by the exhaust gas temperature sensor 2, the adsorbent temperature sensor 3, the exhaust gas temperature sensor 5 and the catalyst temperature sensor 7 so that the optimum temperature for the regeneration of the adsorbent can be attained.

In the present embodiment, the heat necessary for the regeneration of the adsorbent can be positively provided and the flexibility in choice of the geometrical configuration and the layout of the bypass exhaust pipe 13, etc. is enhanced. Since the heat necessary for the regeneration is obtained from the exhaust gas containing no unburnt hydrocarbons, etc. which has been treated with the main catalyst 8, regeneration of the adsorbent can be completely conducted.

A sixth embodiment will be described with reference to FIG. 7.

Figure 7:
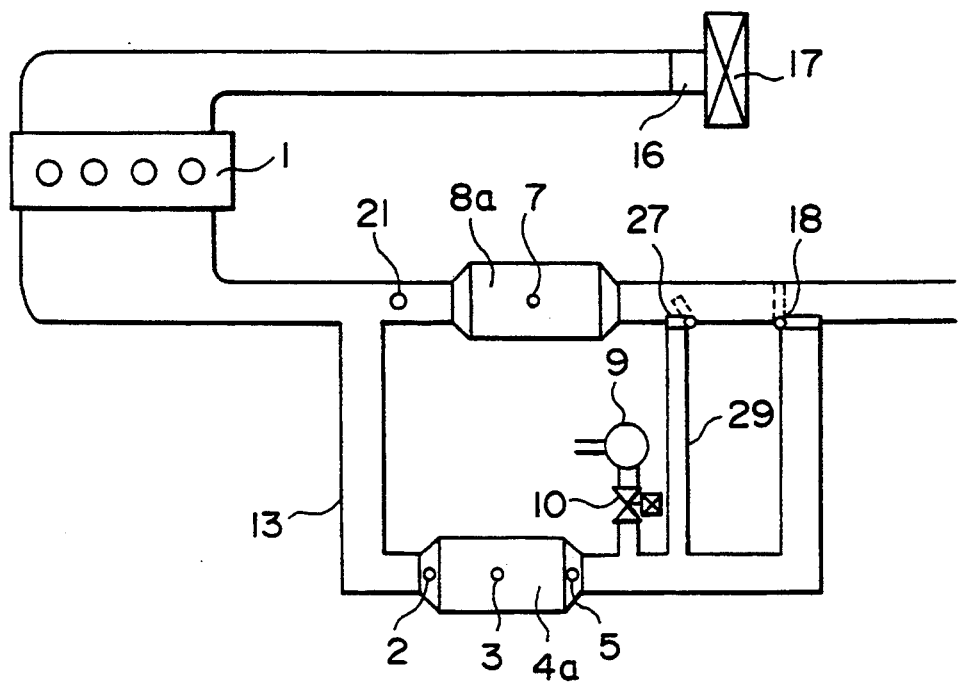
FIG. 7 is a schematic diagram showing a sixth embodiment of an exhaust gas purifying system of the present invention for use in an automobile.

The present embodiment shown in FIG. 7 is substantially identical with FIG. 4 except that an exhaust gas introducing valve 27 is provided downstream of the main catalytic converter 8a so that the exhaust gas introduced via the exhaust gas introducing valve 27 is introduced to the downstream side of the adsorber 4a in the bypass exhaust pipe 13 through a subsidiary bypass exhaust pipe 29. The heat necessary for the regeneration of the adsorber 4 is obtained from the exhaust gas introduced through the subsidiary bypass exhaust pipe 29. The opening of the exhaust gas introducing valve 27 is adjustable based upon the results detected by the exhaust gas temperature sensor 2 and the adsorbent temperature sensor 3, etc. Although the subsidiary bypass exhaust pipe 29 is in communication with the bypass exhaust pipe 13 downstream of the position where the secondary air amount control valve 10 is provided in the bypass exhaust pipe 13, the subsidiary exhaust pipe 13 may be in communication with the bypass exhaust pipe 29 between the adsorber 4a and the secondary air amount control valve 10.

The operation of the sixth embodiment will be described.

The basic operation of the present embodiment is substantially identical with that of the embodiment shown in FIG. 4.

When the adsorbent 4 is regenerated, the exhaust gas introducing valve 27 is opened to cause the hot exhaust gas to pass through the adsorbent 4 so that the adsorbent 4 can be easily heated up to the regeneration zone. The opening of the exhaust gas introducing valve 27 is adjusted based upon the detection results from the exhaust gas temperature sensor 2, the adsorbent temperature sensor 3, the exhaust gas temperature sensor 5 and the catalyst temperature sensor 7 so that the optimum temperature can be attained.

In the present embodiment, the heat necessary for the regeneration of the adsorbent can be easily obtained. The restriction of the geometrical configuration, the layout, etc. of the bypass exhaust pipe 13 to obtain the heat necessary for the regeneration is reduced so that flexibility in design is increased. It is also possible to conduct sufficient desorption of the unburnt hydrocarbons by introducing the exhaust gas to the adsorber 4a via the subsidiary exhaust pipe 29.

Figure 8:
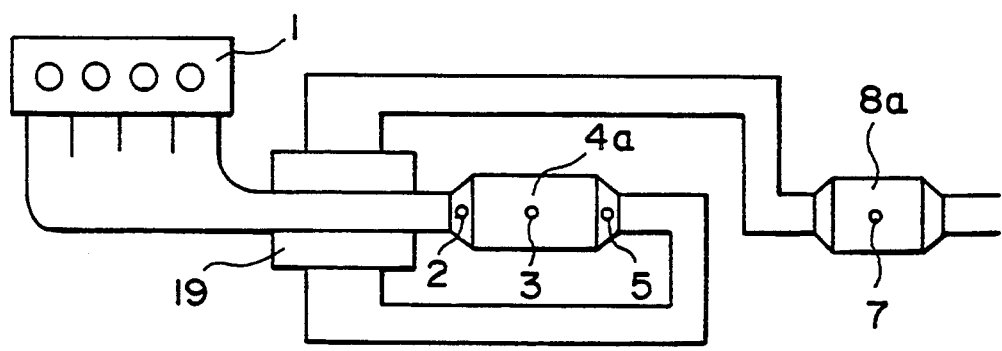
FIG. 8 is a schematic diagram showing a seventh embodiment of an exhaust gas purifying system of the present invention for use in an automobile.

Now, a seventh embodiment will be described with reference to FIG. 8.

In the present embodiment, only one exhaust passage is provided and no bypass is provided as is similar to the first embodiment shown in FIG. 2. The adsorber 4a and the main catalytic converter 8a are serially arranged in the exhaust passage as is similar to the first embodiment. However, the present embodiment is different from the first embodiment of FIG. 2 in that a heat exchanger 19 is provided upstream of the adsorber 4a.

The exhaust gas passage is arranged in such a manner that heat is exchanged between a portion of the line upstream of the adsorber 4a and a portion of the line between the adsorber 4a and the main catalytic converter 8a via the heat exchanger 19. This arrangement makes it possible to independently adjust the temperature of the adsorbent 4 to some extent without preventing the elevation in temperature of the main catalyst 8 although the adsorber 4a and the main catalytic converter 8a are serially arranged. The desorption zone of the adsorbent 4 used in the present embodiment may be lower than the light off temperature of the main catalyst 8 as long as it is in a range which is adjustable by the heat exchanger 19. The thermal resistance of the adsorbent 4 may be lower than that in the case where there is no heat exchanger 19.

The operation of the present embodiment will be described.

The exhaust gas which is emitted from the engine immediately after starting of the engine 1 loses some of its heat through the heat exchanger 19 resulting in the temperature of the exhaust gas being lowered to some extent. Accordingly, a large quantity of heat is not directly given to the adsorbent 4. However, the unburnt hydrocarbons in the exhaust gas are not influenced by the presence of the heat exchanger 19 and are-passed through the heat exchanger 19 and then adsorbed by the adsorbent 4.

On the other hand, since the heat which has been removed by the heat exchanger 19 is returned to the exhaust gas flow line in the upstream side of the main catalytic converter 8 again, the period of time which is taken for the main catalyst 8 to reach the light off temperature is shortened correspondingly to the fact that the temperature of the adsorbent 4 is not elevated. Conversely, it is possible to delay the time when the temperature of the adsorbent 4 reaches the desorption zone until the main catalyst 8 reaches the light off temperature.

The temperature of the adsorbent 4 can be easily elevated to reach the regeneration zone by adjusting the capability of the heat exchanger 19 when the adsorbent 4 is to be regenerated.

Although not described in detail, the adjustment of the capability of the heat exchanger 19 is performed based upon the results of detection from the exhaust gas temperature sensor 2, the adsorbent temperature sensor 3, the exhaust gas temperature sensor 5 and the catalyst temperature sensor 7, etc. This makes it possible to perform accurate control of the temperature. Although the heat exchanger 19 is provided separately from the main catalytic converter 8, they may be integrally provided.

Now, an eighth embodiment will be described with reference to FIG. 9.

The present embodiment has a feature that the unburnt hydrocarbons are prevented from being externally discharged by combusting the unburnt hydrocarbons in the exhaust gas passage in the transition from the adsorbent to the catalyst.

The exhaust gas flow line is provided with the bypass exhaust pipe 13, and the adsorber 4a is disposed in the bypass exhaust pipe 13. The main catalytic converter 8a is disposed in the main flow line downstream of the connection between the main flow line and the bypass exhaust pipe 13 so that all the exhaust gas always passes through the main catalytic converter 8a.

An exhaust passage change-over valve 31, the opening of which is adjustable is provided at the entrance of the bypass exhaust pipe 13. A flow rate control valve 14 which controls the flow rate of the exhaust gas flowing through the bypass exhaust pipe 13 is provided at the exit of the bypass exhaust pipe 13. Selection whether the exhaust gas reaches the main catalytic converter 8a via the adsorber 4a or directly reaches the main catalytic converter 8a without passing through the adsorber 4a can be made by controlling these valve 31 and 14. The adsorbent 4 which is used in the present embodiment may have the desorption zone which is lower than the light off temperature of the catalyst 8. The thermal resistance of the adsorbent 4 need not necessarily be as high as that of the catalyst.

The secondary air pump 9 and the secondary air amount control valve 10 for burning the unburnt hydrocarbons and for adjusting the concentration of the oxygen are provided upstream of the branch between the main passage of the exhaust gas passage and the bypass exhaust pipe 13.

The exhaust temperature sensor 2, the adsorbent temperature sensor 3, the exhaust gas temperature sensor 5 and the catalyst temperature sensor 7 are identically with those in the foregoing embodiment. The details of these sensors will be described hereafter.

On starting of the engine, the exhaust passage change-over valve 31 is brought into a position a, i.e. a completely closed position to cause the exhaust gas to flow through the bypass exhaust pipe 13. At this time, the flow rate control valve 14 is fully opened to reduce the resistance to the flow of the exhaust gas. In order to enhance the adsorption efficiency the flow rate control valve 14 may be partially closed to reduce the space velocity of the exhaust gas so far as the discharge of the exhaust gas is not prevented. In this case, control of the flow rate control valve 14 is made upon the basis of the amount of the exhaust gas which is calculated from the detection result of the air amount detector 16 for achieving optimum control of the flow rate control valve 14. The secondary air pump 9 and the secondary air amount control valve 10 need not be operated. Under this condition, the unburnt hydrocarbons in the exhaust gas will be adsorbed by the adsorbent 4. Since all the exhaust gas passes through the main catalytic converter 8a as mentioned above, the temperature of the main catalyst 8 is elevated.

At this time, the temperatures of the adsorbent 4 and the main catalyst 8 are monitored based upon the outputs of the exhaust gas temperature sensor 2, the adsorbent temperature sensor 3, the exhaust gas temperature sensor 5 and the catalyst temperature sensor 7. When the temperature of the adsorbent 4 comes close to the desorption zone, the exhaust passage change-over valve 31 is brought into a position b and the flow rate control valve 14 is closed to stop the flow of the exhaust gas through the bypass exhaust pipe 13. On the other hand, the secondary air pump 9 and the secondary air amount control valve 10 are actuated correspondingly to the operation of the valves 31 and 14 so that fresh air is introduced into the exhaust gas flowing through the main passage. Then, the unburnt hydrocarbons in the exhaust gas are burnt with the fresh air prior to reaching the main catalyst 8. Accordingly, the unburnt hydrocarbons will not be externally discharged without being treated even if the main catalyst 8 has not reached the light off temperature at the time when the exhaust gas passage is switched from the bypass exhaust pipe 13 to the main passage by means of the exhaust passage change-over valve 31.

When the main catalyst 8 has reached the light off temperature, the exhaust passage change-over valve 31 is brought into an intermediate position, i.e. a position between positions a and b to cause the exhaust gas to flow into the bypass exhaust pipe 13 to some extent. This elevates the temperature of the adsorbent 4 to the desorption zone to desorb the unburnt adsorbed hydrocarbons. At this time, the flow rate control valve 14 is fully opened to reduce the resistance against the exhaust gas.

Although treatment of the unburnt hydrocarbons per se is possible only by the capacity of the main catalyst 8 when the main catalyst 8 has reached the light off temperature, air is admitted to some extent to the exhaust pipe via the secondary air pump 9 and the secondary air amount control valve 10 in order to prevent the concentration of the oxygen from being low and thus being short of oxygen due to the presence of the unburnt hydrocarbons desorbed from the adsorbent 4.

Regeneration of the adsorbent 4 is carried out under the usual running condition. In this case, the exhaust passage change-over valve 31 is brought into an intermediate position as is similar to the case of desorption to admit exhaust gas to some extent into the bypass exhaust pipe 13 so that the temperature of the adsorbent 4 is elevated to the regeneration zone. However, it is not necessary to actuate the secondary air pump 9 and the secondary air amount control valve 10 unlike the case of desorption. The flow rate control valve 14 is fully opened to reduce the resistance.

If a high load is imposed upon the engine during running, the exhaust passage change-over valve 31 is controlled and the flow rate control valve 14 is closed so that the exhaust gas will not flow into the bypass exhaust pipe 13 since the temperature of the exhaust gas may otherwise exceed the limit of thermal resistance of the adsorbent 4.

Figure 10:
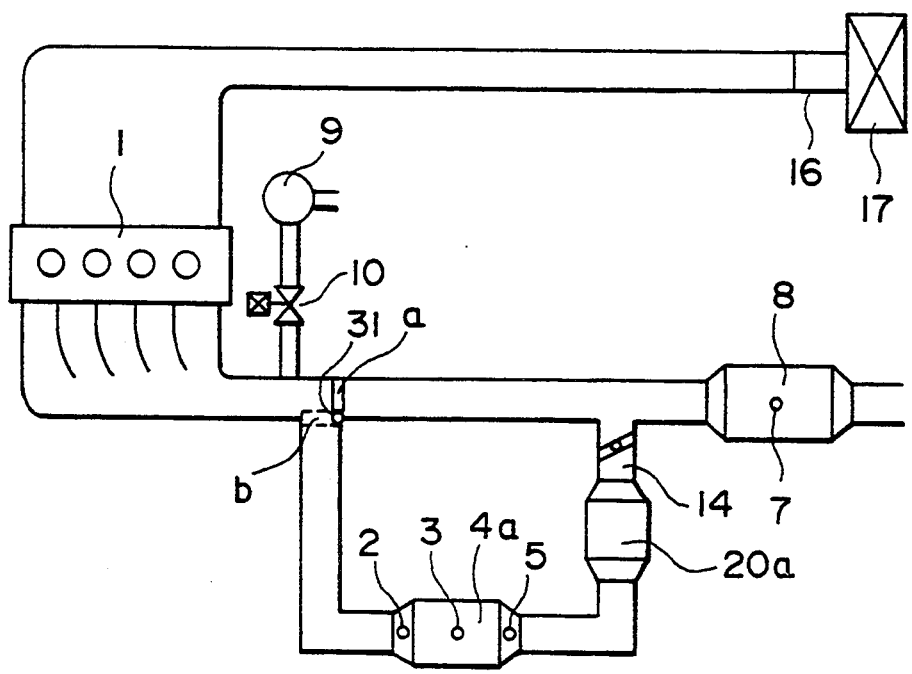
FIG. 10 is a schematic diagram showing a ninth embodiment of an exhaust gas purifying system of the present invention for use in an automobile.

A ninth embodiment will be described with reference to FIG. 10.

Figure 9:
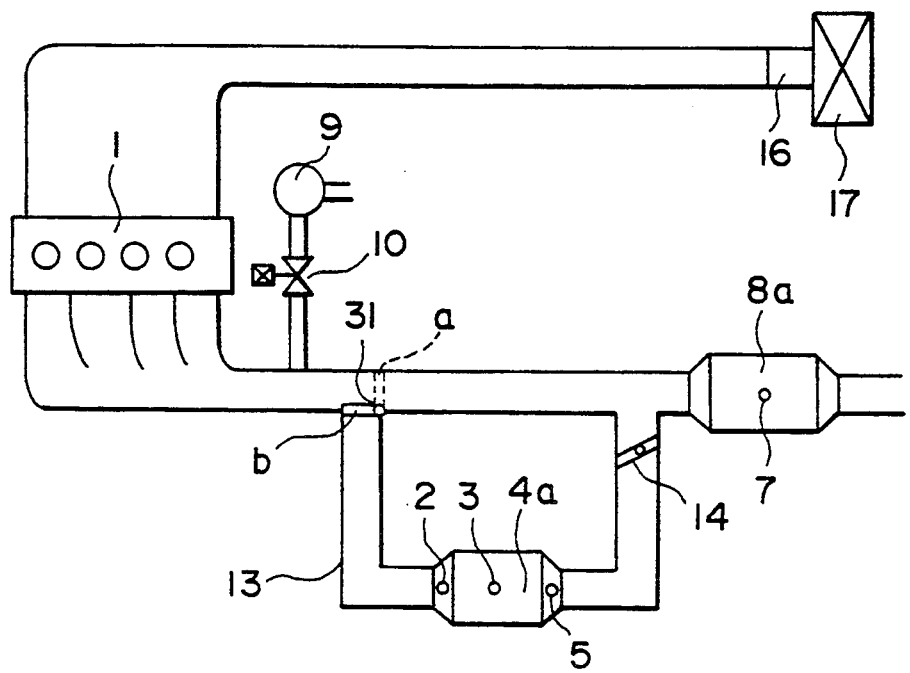
FIG. 9 is a schematic diagram showing an eighth embodiment of an exhaust gas purifying system of the present invention for use in an automobile.

The present embodiment is substantially identical with the embodiment of FIG. 9 except that a converter 20a containing a low temperature active catalyst 20 is provided between the adsorber 4a and the flow rate control valve 14 in the bypass exhaust pipe 13.

Such an arrangement can prevent the unburnt hydrocarbons from externally discharging even if the adsorbent 4 should become saturated. The unburnt hydrocarbons can be treated with the low temperature active catalyst 20 even if the main catalyst 8 has not reached the light off temperature when the adsorbed unburnt hydrocarbons are to be desorbed. Accordingly, it is not necessary to close the exhaust passage change-over valve 31 and the flow rate control valve 14 until the main catalyst 8 reaches the light off temperature. The exhaust gas can be treated more quickly. This is advantageous particularly in the case where a very large amount of unburnt hydrocarbons are emitted due to the temperature of the main catalyst 8 not being elevated sufficiently which can occur when repeatedly starting and stopping the engine in a short period of time such as during repair and maintenance.

Temperature control in the above mentioned embodiments will now be described.

The adsorbent 4 should have a sufficient adsorbing capacity. It is difficult to reduce the size of the adsorber below a predetermined size. It is necessary to increase the surface area of the adsorbent in order to increase the adsorbing speed. Accordingly, a large space exists in the adsorbent 4. Therefore, it is hard to make the temperature in the adsorbent uniform throughout the adsorbent. Accordingly, the distribution of the temperature of the adsorbent 4 is measured by means of a plurality of thermal sensors.

Control of various valves, etc. is carried out with reference to the maximum temperature in the adsorber 4a. Determination whether the temperature of the adsorbent 4 reaches the limit of the thermal resistance is of course made with reference to the maximum temperature. Since it is necessary to perform the desorption and regeneration of the entire adsorbent, temperature control is determined with reference to the minimum temperature for controlling various components.

Detection of temperature in the above mentioned embodiments will be described in detail.

In the foregoing embodiments, the temperature of the adsorbent 4 is determined based upon the temperatures in three positions by means of the exhaust gas temperature sensor 2, the adsorbent temperature sensor 3 and the exhaust gas temperature sensor 5.

Since the temperature is usually higher in the upstream side, determination on adsorption and the limit of thermal resistance is made by using the detection result of the exhaust gas temperature sensor 2. Since it is considered that the minimum temperature is detected in the exit side, determination on desorption and regeneration is made by using the detection result of the exhaust gas temperature sensor 5.

Figure 11:
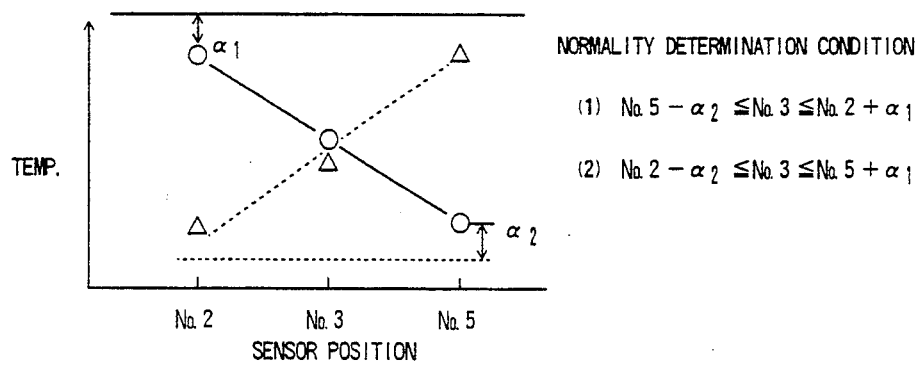
FIG. 11 is a graph showing a rule for temperature control.

The adsorber temperature sensor 3 is not used for the specific control, but is used for diagnosing whether or not the exhaust gas temperature sensor 2 and the exhaust gas temperature sensor 5 are functioning normally. In other words, the results which are detected by the exhaust gas temperature sensor 2, the adsorbent temperature sensor 3 and the exhaust gas temperature sensor 5 are compared with each other. If the temperatures are distributed as shown in FIG. 11, it is determined that the sensors are functioning normally. A slight margin represented in the drawing as "α" is provided for making the determination of the normal function of the sensors.

Control of various valves in each of the above mentioned embodiments is made based upon control values which are calculated by a given operation of the data from the sensors performed by the control unit 23. Some of the inputs and output to and from the control unit 23 are shown in FIG. 12.

In accordance with the present invention, the unburnt hydrocarbons are not externally discharged without being treated even when an exhaust gas treating catalyst does not function, for example, immediately after starting of an engine mentioned above. Although embodiments in which the unburnt hydrocarbons are adsorbed have been described, it is to be understood that the present invention is also applicable to the elimination of NOx and other harmful materials.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A system for purifying an exhaust gas for use in an automobile, comprising:

an exhaust gas main passage for discharging the exhaust gas from an engine;

a bypass passage for connecting an upstream portion of said exhaust gas main passage with a downstream portion of the exhaust gas main passage;

adsorbent disposed in said bypass passage having a temperature range at which said adsorbent adsorbs unburnt hydrocarbons, (the adsorption zone), a temperature range above the adsorption zone, at which said adsorbent desorbs the adsorbed unburnt hydrocarbons are desorbed therefrom, (the desorption zone), and a further higher temperature range at which the adsorbed material which can not be completely desorbed in said desorption zone can be eliminated from said adsorbent, (the regeneration zone);

exhaust gas treating catalyst provided in said exhaust gas main passage in parallel with said bypass passage;

means for detecting the temperature of at least one of said adsorbent and said catalyst;

air supplying means disposed in said bypass passage downstream of said adsorbent;

passage changing means provided at the exit of said bypass passage for adjusting the ratio of the flow rate of the exhaust gas through said exhaust gas main passage to that through said bypass passage; and means for controlling said passage changing means in such a manner that the exhaust gas is caused to flow through said bypass passage when the temperature of said adsorbent falls into the adsorption zone and said bypass passage is closed to cause the exhaust gas to flow through the main passage and air is supplied to said bypass passage by said air supply means when the temperature of the adsorbent falls into the desorption zone.

2. A system for purifying an exhaust gas for use in an automobile as defined in claim 1 and further including subsidiary bypass means for introducing the exhaust gas into said bypass passage in the downstream side of said adsorbent from said exhaust gas main passage;

said control means being capable of elevating the temperature of said adsorbent up to the regeneration zone by causing the exhaust gas to flow into said bypass passage via said subsidiary bypass passage.

* * * * *